United States Patent
Eblen

[11] 3,828,475
[45] Aug. 13, 1974

[54] GATE OPENER
[76] Inventor: Perry W. Eblen, 111 High St., Oakland, Iowa 51560
[22] Filed: Oct. 6, 1972
[21] Appl. No.: 295,569

[52] U.S. Cl................................. 49/394, 292/254
[51] Int. Cl....................... E05c 17/08, E05b 65/06
[58] Field of Search............ 49/282, 283, 394, 381, 49/386, 374, 364; 292/394, 254

[56] References Cited
UNITED STATES PATENTS

| | | | |
|---|---|---|---|
| 323,308 | 7/1885 | Finck | 292/254 |
| 460,820 | 10/1891 | Finch | 292/254 |
| 761,290 | 5/1904 | Fagan | 292/254 X |
| 1,153,847 | 9/1915 | Huffman | 49/282 |
| 1,126,728 | 2/1915 | Dillabough | 292/254 X |
| 2,718,079 | 10/1955 | Strey | 49/394 X |
| 3,353,300 | 11/1967 | Wray | 49/394 X |

Primary Examiner—Dennis L. Taylor
Attorney, Agent, or Firm—Zarley, McKee & Thomte

[57] ABSTRACT

A device for opening and closing a gate comprising a normally closed latch means at the free end of the gate and a spring means at the other end of the gate for returning the gate to its closed position. One form of the latch means comprising a latching arm which is pivotally secured to the post adjacent the free end of the gate and which may be moved between locked and unlocked positions. A bar means extends from the free end of the gate for engagement with the latching member to maintain the gate in its closed position. An elongated flexible cable is secured to the latching member and extends upwardly therefrom to a location adjacent the approach area of the gate to permit a person on a tractor or the like to grasp the cable and to move the latching member to its unlocked position. The tractor is then driven against the gate which causes the gate to swing open as the tractor is driven thereby. Once the tractor has disengaged from the gate, the spring means causes the gate to return to its closed position. The modified form of the latch means comprises a spring loaded plunger element which is secured to the free end of the gate and which is received by an opening in a bracket secured to a post adjacent the free end of the gate.

8 Claims, 10 Drawing Figures

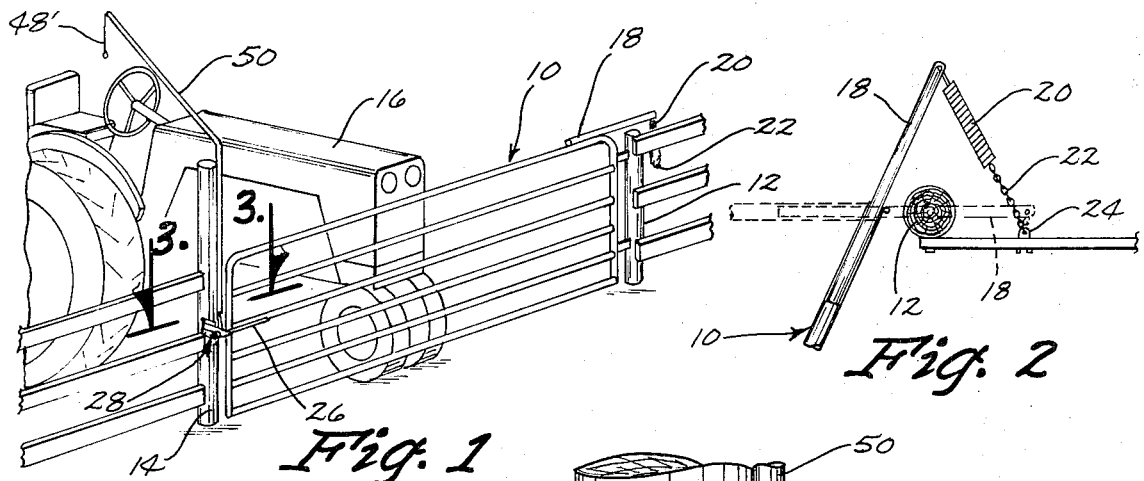
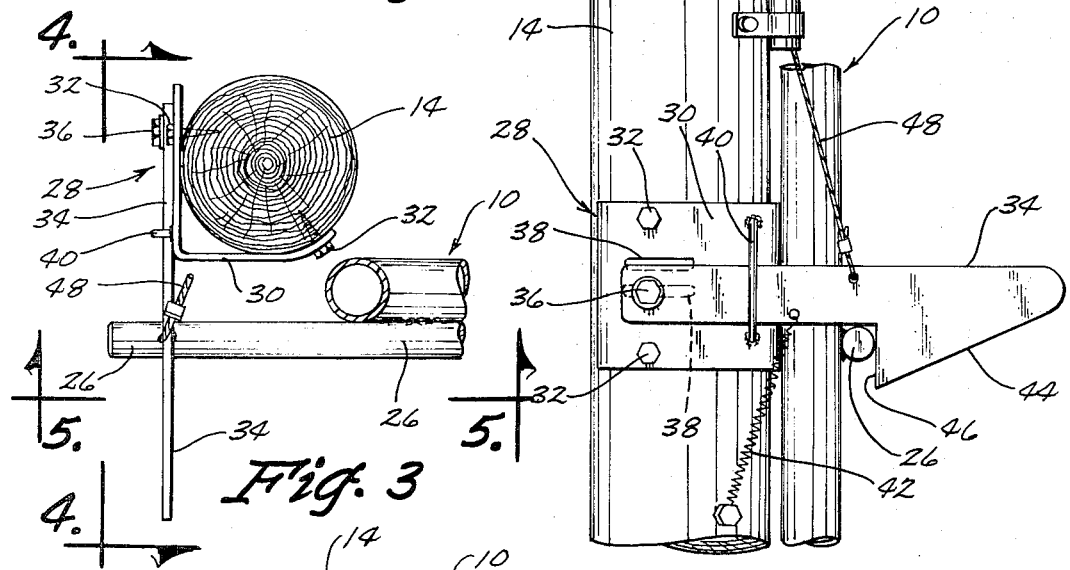
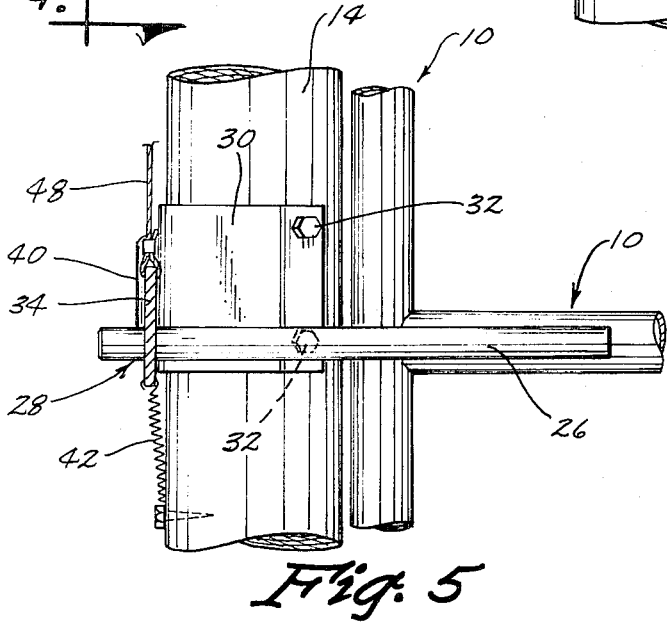

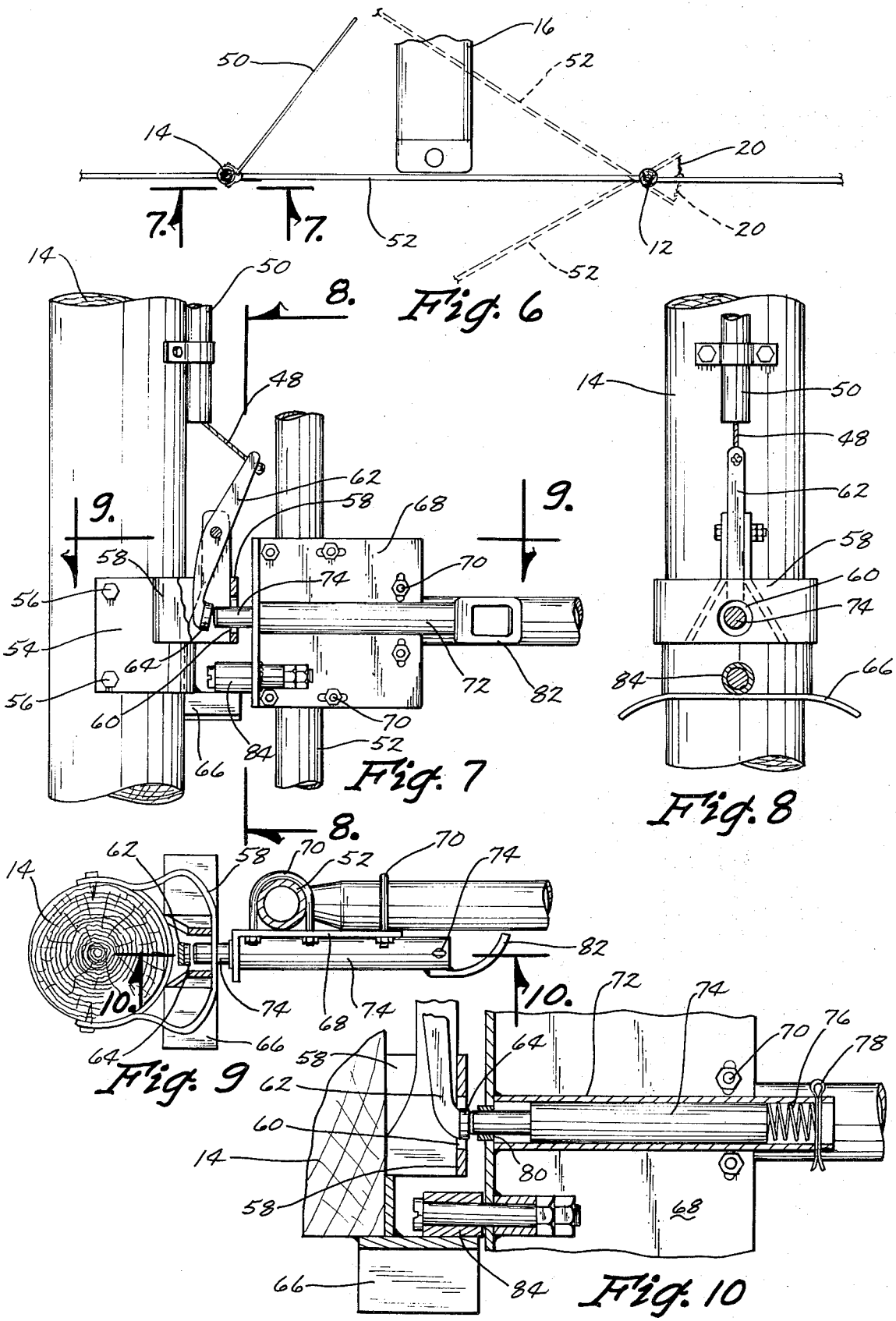

GATE OPENER

BACKGROUND OF THE INVENTION

This invention relates to a device for opening and closing a gate and more particularly to a means for remotely opening the gate and means for causing the gate to close after the vehicle has passed therethrough.

It is highly desirable to be able to open and close a gate without dismounting from a vehicle such as a tractor or the like. This is especially desirable in feedlot operations since the cattle will sometimes leave the feedlot through the open gate during the time that the operator has opened the gate and is returning to the tractor or during the time that the operator is dismounting from the tractor to close the gate after he has driven therethrough.

Therefore, it is a principle object of the invention to provide an improved means for opening and closing a gate.

A further object of the invention is to provide a device for opening and closing a gate which can be remotely controlled.

A further object of the invention is to provide a device for opening and closing a gate which can be used on a gate whether the gate opens in a single direction or opens in two directions.

A further object of the invention is to provide a device for opening and closing a gate having means thereon to permit the device to accommodate various types of gates.

A further object of the invention is to provide a means for opening and closing a gate having means thereon which insures that the gate will be positively closed.

A further object of the invention is to provide a means for closing a gate which automatically closes the gage after the vehicle has passed therethrough.

A further object of the invention is to provide a device for opening and closing a gate which is economical in manufacture and durable in use.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a perspective view illustrating one form of the invention;

FIG. 2 is a plan view of the means for closing the gate;

FIG. 3 is an enlarged sectional view seen along lines 3—3 of FIG. 1;

FIG. 4 is an end view as seen along lines 4—4 of FIG. 3;

FIG. 5 is an enlarged sectional view seen along lines 5—5 of FIG. 3;

FIG. 6 is a plan view illustrating a gate which may be opened in opposite directions;

FIG. 7 is a view seen along lines 7—7 of FIG. 6 with portions thereof cut away to more fully illustrate the invention;

FIG. 8 is a sectional view seen along lines 8—8 of FIG. 7;

FIG. 9 is a sectional view seen along lines 9—9 of FIG. 7; and

FIG. 10 is an enlarged sectional view seen along lines 10—10 of FIG. 9.

DESCRIPTION OF THE PREFERRED EMBODIMENTS

In the drawings, the numeral 10 refers generally to the conventional gate which is hingedly secured at one end to a support means such as a post 12 or the like. The numeral 14 refers to a support such as a post or the like which is positioned at the free end of the gate. A vehicle such as a tractor 16 or the like is shown in the drawings.

Arm 18 is secured to gate 10 and extends therefrom towards the post 12 as illustrated in FIGS. 1 and 2. Spring 20 is secured at one end thereof to the free end of arm 18. A link chain 22 is secured to the other end of spring 20 and is adjustably secured to a hook or bracket 24. Bracket 24 may be secured to any suitable support means such as seen in FIG. 2. The spring 20 is not under tension when the gate is closed but is placed under tension to resist the opening of the gate as illustrated in FIG. 2. The link chain 22 may be selectively secured to the bracket 24 to increase or decrease the amount of resistance which spring 20 will offer to the opening of the gate.

The numeral 26 refers to a bar which is secured to the gate 10 and which extends horizontally outwardly therefrom as illustrated in FIG. 3. A latch means is provided on the post 14 and is referred to generally by the reference numeral 28. Latch means 28 comprises a mounting bracket 30 which is secured to the post 14 by lag screws 32 or the like. A latching member 34 is pivotally secured at one end thereof to the bracket 28 by means of a bolt 36 extending therethrough and being received by a slot 38 formed in the bracket 28. As seen in FIG. 4, bracket 28 has a pair of slots 38 formed therein to permit the latch means to accommodate gates of different sizes.

As seen in FIGS. 3 and 4, latch member 34 extends through a guide element 40 which limits the upward and downward movement of the latch member 34. Spring 42 is secured to the latch member 34 and to the post 14 to yieldably resist the upward movement of the latch member 34 from its position illustrated in FIG. 4. Latch member 34 has a downwardly tapered guide surface 44 at its free end having a shoulder 46 positioned adjacent thereto which receives the bar 26 so as to prevent the gate 10 from being opened unless the latch member 34 is pivotally raised upwardly from the position of FIG. 4.

A flexible cable is secured to latch member 34 and extends upwardly therefrom through a conduit or housing 50 which extends upwardly and away from the post 14 to the approach area of the gate. It is preferred that the housing 50 be length adjustable to accommodate tractors of various sizes.

With respect to the embodiment seen in FIGS. 1–5, the normal method of operation is as follows. Assuming that the gate is in the closed position illustrated in FIG. 1, the tractor is driven into the approach area of the gate until the operator can grasp the free end of the flexible cable 48 which is generally referred to by the reference numeral 48'. The operator pulls on the flexible cable which causes the latch member 34 to be pivotally raised from the position of FIG. 4. The tractor is then driven against the gate which causes the gate to swing open as the tractor is driven through the gate opening. As the tractor pivotally moves the gate to its open position, spring 20 is placed under tension and yieldably resists the opening of the gate. As the tractor leaves the gate area and becomes disengaged from the gate, the spring 20 swings the gate back to the closed position. The bar 24 engages the tapered guide surface 44 of the latch member 34 as the gate swings to its closed position thereby causing the latch member 34 to be pivotally moved upwardly until such time as the bar 26 is behind the shoulder 46 so that the gate is again in its locked position. The chain 22 can be adjustably secured to the bracket 24 to increase or decrease the amount of force applied to the gate 10 so as to return it to its closed position.

FIGS. 6–10 illustrate a modified form of the invention which is designed to be used with a gate which can swing in opposite directions. In other words, the gate of FIG. 1 can only be opened in a single direction while the gate 52 in FIG. 6 can be opened in two directions. Post 14 has a bracket 54 secured thereto by means of lag bolts 56. Bracket 54 is provided with a substantially U-shaped member 58 which extends outwardly therefrom and which has an opening 60 formed therein. Lever 62 is pivotally secured to the member 58 and has an end portion 64 which is adapted to move into the opening 60 when the lever 62 is pivotally moved by the flexible actuating cable 48. Guide means 66 is secured to the bracket 54 and extends outwardly therefrom as illustrated in FIGS. 7 and 8. As seen in FIG. 8, the outer ends of the guide means 66 are tapered downwardly to aid in properly positioning the gate with respect to the latch means on the post 14.

Plate 68 is secured to the gate 52 by means of U-bolts 70 as illustrated in FIG. 9. Plunger housing 72 is secured to the plate 68 by welding or the like and has a plunger 74 horizontally slidably moveable therein as illustrated in FIG. 10. Spring 76 is provided in the housing 72 behind the plunger 74 to yieldably maintain the plunger 74 in the extended position illustrated in FIG. 7. A cotter key 78 maintains the spring 76 and the plunger 74 in the housing 72. Plunger 74 extends outwardly through the opening 80 in plate 68 and is adapted to be received by the opening 60 when the gate is in its closed position such as illustrated in FIG. 7. An arcuate guide 82 is provided on the inner end of the housing 72 to prevent the tractor tires or chains to become entangled or caught thereon. An adjustable roller 84 is secured to the plate 68 as illustrated in FIG. 10 and is adapted to engage the guide surface 66 as the gate is being closed so that the plunger 74 will be properly positioned with respect to the opening 60. The downwardly tapered outer ends of the guide surface 66 are provided so that the roller 84 can engage the same and move the gate upwardly into the proper position since most gates tend to droop somewhat due to the weight thereof.

The embodiment of FIGS. 6–10 may be employed as follows. The tractor 16 can be driven adjacent either side of the gate 52 since the gate can open in either direction. FIG. 6 illustrates a single housing 50 extending into the approach area of the gate and it should be understood that a second housing 50 and actuating cable would extend to the other side of the gate so that the gate can be opened from either side thereof. The operator pulls the free end of the flexible cable 48 which causes the lever 62 to pivotally move with respect to the bracket 54 so that the end portion 64 of the lever 62 engages the outer end of the plunger 74. The lever 62 pushes the plunger 74 outwardly from the opening 60 to permit the gate to swing open as the tractor engages the same and pushes the gate to its open position. After the tractor has driven through the gate opening and has become disengaged from the gate, the spring 20 causes the gate to return to its closed position. As the gate swings to its closed position, the guide roller 84 engages the guide surface 66 so as to properly position the plunger 74 with respect to the opening 60. As the gate closes, the plunger 70 will be in its extended position and will engage the U-shaped member 58 which will cause the plunger 74 to again be moved into the housing 72. As soon as plunger 72 registers with opening 60, spring 76 drives the plunger 74 into the opening 60 to maintain the gate in its locket position.

It can be seen that both of the embodiments herein permit the gate associated therewith to be unlocked from a position remote therefrom so that the tractor operator does not have to dismount from the tractor. As soon as the tractor has passed through the gate opening and has become disengaged from the gate, the gate automatically swings closed which prevents the need for the operator from dismounting from a tractor to close the gate. The operation of the gate disclosed herein is especially useful in feedlot operations since the gate is closed immediately upon the tractor becoming disengaged from the gate which prevents the animals from leaving the feedlot. Thus it can be seen that the device of this invention accomplishes at least all of the stated objectives.

I claim:
1. In combination,
a first support means,
a normally closed gate means hingedly secured at one end thereof to said first support means,
a second support means adjacent the other end of said gate means,
a latch means on said second support means movable between locked and unlocked positions,
means on said gate means engageable with said latch means when said latch means is in said locked position to maintain said gate means in its closed position,
an actuating means connected to said latch means for moving said latch means to its unlocked position, said actuating means extending therefrom to a location adjacent the approach area of the gate means,
means secured to said gate means for returning said gate means to its closed position subsequent to the gate means having been opened,
said actuating means comprising a flexible member extending upwardly and away from said latch means,
said gate means being prevented from opening by said latch means until said flexible member has been longitudinally moved so that the engagement of animals with said gate will not cause said gate to be inadvertently opened,
said latch means comprises a bracket secured to said second support means, said bracket having a first opening formed therein, said means on said gate means engageable with said latch means comprises a horizontally slidable plunger which is receivable by said first opening when said gate means is in its closed position, said actuating means comprises a lever element pivotally secured to said bracket, said lever element having a portion thereof which is moveable towards said plunger to push said plunger from said first opening to permit said gate means to be opened.

2. The combination of claim 1 wherein said means secured to said gate means for returning said gate means to its closed position comprises a first arm means secured to said gate means and extending towards said first support means, and a spring means secured to said first arm means which yieldably resists the opening of said gate means and which is placed under tension when the gate means is moved to its open position.

3. The combination of claim 2 wherein said spring means has means thereon for selectively adjusting the yieldable resistance which said spring means imposes on said gate means.

4. The combination of claim 1 wherein at least a portion of said flexible member is enclosed in an elongated housing.

5. The combination of claim 1 wherein a flexible member is secured to said lever element and extends therefrom.

6. The combination of claim 1 wherein a first guide element is secured to said bracket, a second guide element secured to said gate means, said first and second guide elements cooperating to properly position said plunger with respect to said first opening.

7. The combination of claim 6 wherein said first guide element comprises a flange element having a horizontally disposed center portion and at least one end portion extending downwardly and outwardly therefrom.

8. The combination of claim 7 wherein said second guide element comprises a roller element.

* * * * *